(12) United States Patent
Faure

(10) Patent No.: US 8,281,088 B2
(45) Date of Patent: Oct. 2, 2012

(54) METHOD OF CUSTOMIZING A MEMORY LIFESPAN MANAGEMENT POLICY IN AN ELECTRONIC TOKEN

(75) Inventor: Frédéric Faure, Cassis (FR)

(73) Assignee: Gemalto SA, Meudon (FR)

( * ) Notice: Subject to any disclaimer, the term of this patent is extended or adjusted under 35 U.S.C. 154(b) by 320 days.

(21) Appl. No.: 12/746,582

(22) PCT Filed: Dec. 5, 2008

(86) PCT No.: PCT/EP2008/066873
§ 371 (c)(1),
(2), (4) Date: Jun. 7, 2010

(87) PCT Pub. No.: WO2009/074515
PCT Pub. Date: Jun. 18, 2009

(65) Prior Publication Data
US 2010/0281206 A1    Nov. 4, 2010

(30) Foreign Application Priority Data

Dec. 13, 2007 (EP) .................................... 07301665

(51) Int. Cl.
*G06F 12/00* (2006.01)
(52) U.S. Cl. ............................................. 711/159
(58) Field of Classification Search ................ None
See application file for complete search history.

(56) References Cited

U.S. PATENT DOCUMENTS

| 7,971,251 B2 * | 6/2011 | Sinha ........................... 726/23 |
| 8,134,954 B2 * | 3/2012 | Godfrey et al. .............. 370/328 |
| 8,151,259 B2 * | 4/2012 | Fadell ........................... 717/173 |
| 8,160,598 B2 * | 4/2012 | Savoor ........................... 455/450 |
| 8,196,199 B2 * | 6/2012 | Hrastar et al. ................. 726/22 |
| 2007/0103992 A1 | 5/2007 | Sakui et al. |

FOREIGN PATENT DOCUMENTS

| FR | 2881855 A | 8/2006 |
| WO | WO 03/032664 A1 | 4/2003 |

OTHER PUBLICATIONS

International Search Report for PCT/EP2008/066873 completed Jan. 27, 2009.
Written Opinion for PCT/EP2008/066873 completed Jan. 27, 2009.

* cited by examiner

*Primary Examiner* — Hiep Nguyen
(74) *Attorney, Agent, or Firm* — Buchanan Ingersoll & Rooney PC

(57) ABSTRACT

The invention is a method of customizing a memory lifespan management policy of an electronic token. The electronic token is intended to be connected to a device able to establish a wireless channel. The electronic token has a microprocessor, a communication interface, a first memory intended to comprise said memory lifespan management policy, first means for exchanging data with a distant machine by means of a wireless channel established by said connected device, second means for applying said memory lifespan management policy in said electronic token, and third means for updating said memory lifespan management policy. Said method comprises the steps of—sending data from the distant machine to the electronic token by means of a wireless channel,—updating said memory lifespan management policy as a function of data received from said distant machine.

17 Claims, 3 Drawing Sheets

METHOD OF CUSTOMIZING A MEMORY LIFESPAN MANAGEMENT POLICY IN AN ELECTRONIC TOKEN

FIELD OF THE INVENTION

The present invention relates to methods of customizing a memory lifespan management policy in an electronic token. It relates particularly to methods of customizing a memory lifespan management policy after the personalization step of said electronic token.

PRIOR ART

Electronic tokens are portable electronic devices with limited resources. In general, electronic tokens comprise a plurality of memories of different type. For example, they may comprise memory of RAM, ROM, EEPROM or Flash type. Smart cards, and particularly SIM cards, are electronic tokens.

There is a need for using electronic tokens in the Machine to Machine market, also named as M2M market. M2M market requires hardware/software components able to run in environment conditions covering a large scope and during a long time. Typically, these components may be able to comply with a temperature range from −40° C. up to +125° C., a high level humidity. These components may also comply with a lifespan up to 15 years.

M2M market uses wireless modules which are integrated in systems for providing M2M communicating services. The wireless modules may comprise electronic tokens such as SIM cards. The SIM card chip lifespan depends mostly on two factors: the number of erase/write cycles and the data retention time. Founders generally guarantee these two factors for their chips in SIM card usual conditions, that is to say in the range 20° C.-25° C.

Unfortunately, the number of erase/write cycles supported by a chip and the data retention time of a chip decrease in high temperatures.

In addition, the SIM card chip lifespan also depends on the usage of the SIM card. For example, when an application that stresses a specific part of the memory is often activated, the threshold of maximum number of erase/write cycles may be reached quickly. In particular, the stressed memory area may be a counter or a file frequently updated during an application processing.

It is known to implement long life mechanisms in SIM card to extend the lifespan of SIM memory. In particular, wear leveling and memory cell anti-aging mechanisms may be set in order to improve chip usage time. These mechanisms are initialized before or during the personalization stage of the SIM card.

However, as the SIM card may be welded into a wireless device, the future usage of the wireless device and of the SIM card may not be known at welding stage.

As a consequence, long life mechanisms cannot be optimized to the future usage of each SIM card. A solution may consist in considering the worst scenario in term of usage as well as in term of environment conditions. Nevertheless, the long life mechanisms remains not optimized, since pre-defined memory areas must be protected by such mechanism since the memory usage is not known in advance.

SUMMARY OF THE INVENTION

An object of the invention is to solve the above mentioned technical problem.

The object of the present invention is an electronic token intended to be connected to a device able to establish a wireless channel with a distant machine. Said electronic token comprises a microprocessor, a communication interface, a first memory intended to comprise a memory lifespan management policy. Said electronic token comprises an operating system, first means for exchanging data with a distant machine by means of a wireless channel established by said connected device. Said electronic token comprises second means for applying said memory lifespan management policy in said electronic token. Said electronic token comprises third means for updating said memory lifespan management policy as a function of data received from said distant machine.

Advantageously, the electronic token may comprise a second memory storing properties of said electronic token and said third means may be able to update the memory lifespan management policy as a function of both received data and stored properties.

Advantageously, said electronic token may be intended to store a plurality of items and said received data may identify at least one of said items.

Advantageously, said memory lifespan management policy may be defined by associating at least one rule to at least one of said items.

In a particular embodiment, said memory lifespan management policy may be defined by at least one stress level, wherein at least one rule is associated to each of said stress levels and said received data may comprise an indicator of the stress level associated to each of said items identified by said received data.

Advantageously, said rules may be related to wear leveling mechanism and/or the memory cell anti-aging mechanism.

Alternatively, said items may be logical and/or physical and/or applicative data.

Advantageously, said electronic token may be a subscriber identity card, said wireless channel may be an Over The Air channel and at least one item may be a file of $EF_{sms}$ or $EF_{loci}$ type.

Alternatively, said electronic token may comprise fourth means for generating both an event and related data required for updating the memory lifespan management policy.

Another object of the invention is a method of customizing a memory lifespan management policy of an electronic token. Said electronic token is intended to be connected to a device able to establish a wireless channel with a distant machine. Said electronic token comprises a microprocessor, a communication interface, a first memory intended to comprise said memory lifespan management policy. Said electronic token comprises an operating system, first means for exchanging data with a distant machine by means of a wireless channel established by said connected device. Said electronic token comprises second means for applying said memory lifespan management policy in said electronic token. Said electronic token comprises third means for updating said memory lifespan management policy. Said method comprises the following steps:

a) sending data from the distant machine to the electronic token by means of a wireless channel, and b) updating said memory lifespan management policy as a function of data received from said distant machine.

Advantageously, said electronic token may comprise a second memory storing properties of said electronic token, and during the updating step b) the memory lifespan management policy may be updated as a function of both received data and stored properties.

In an embodiment, said electronic token may store a plurality of items and said received data may identify at least one of said items.

Advantageously, said memory lifespan management policy may be defined by associating at least one rule to at least one of said items.

Advantageously, said memory lifespan management policy may be defined by at least one stress level, at least one rule may be associated to each of said stress levels and said received data may comprise an indicator of the stress level associated to each of the items identified by said received data.

In a preferred embodiment, said rules may be related to wear leveling mechanism and/or the memory cell anti-aging mechanism.

Alternatively, said items may be logical and/or physical and/or applicative data.

In an embodiment, said electronic token may be a subscriber identity card and the wireless channel may be an Over The Air channel.

Advantageously, at least one item may be a file of $EF_{sms}$ or $EF_{loci}$ type.

Another object of the invention is a device comprising means able to establish a wireless channel with a distant machine. Said device comprises a communication interface and an electronic token according to the above-described invention. Said electronic token is connected to the device by means of a welding or in a removable way.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of electronic token able to exchange data with a distant machine by means of a wireless channel established by a connected device. In this specification, the electronic token is a SIM card but it could be any other kind of electronic token comprising both subscriber identity data and means for exchanging data through a wireless channel via a connected wireless device.

An advantage of the invention is to allow an update of the memory lifespan management policy after the usage of the electronic token has been decided. In particular, the invention allows customizing the memory lifespan management policy after the welding step of the SIM in the wireless device. Moreover the invention allows customizing the memory lifespan management policy after usage of the wireless device has been decided.

Another advantage of the invention is to allow customizing the memory lifespan management policy after the wireless device deployment on the field.

Another advantage of the invention is to allow customizing the memory lifespan management policy after a new application has been installed on the electronic token or after the update of an application on the electronic token.

Another advantage of the invention is to allow an update of the memory lifespan management policy after a change of wireless device usage or after an upgrade of an application installed on the device. An additional advantage of the invention is to allow an update of the memory lifespan management policy after a feedback retrieved from the field, thanks to a deployment of a set of wireless devices.

Figure 1:
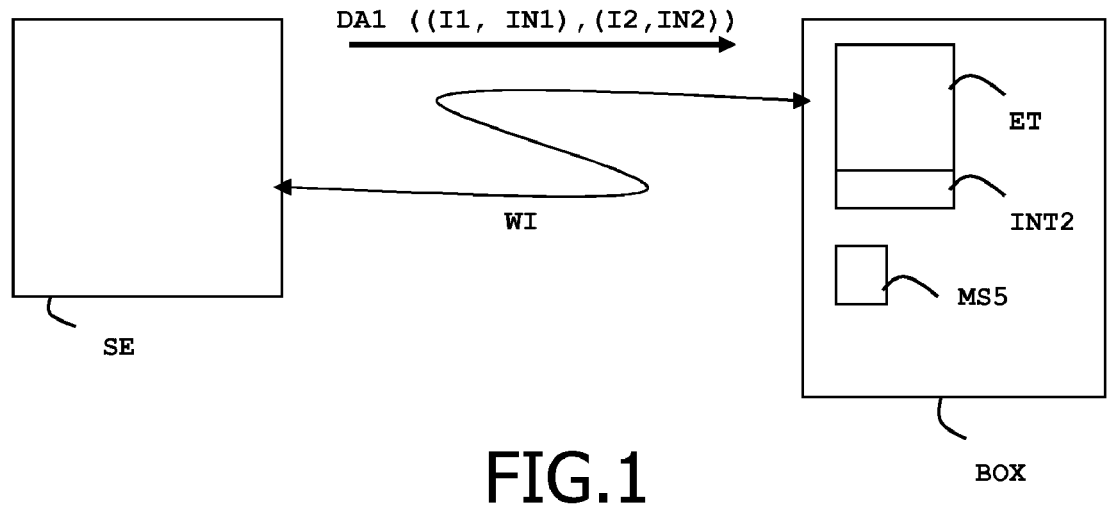
FIG. 1 is an example of a system comprising a wireless device and an electronic token according to the invention.

FIG. 1 shows an example of system comprising a distant machine SE, and a wireless device BOX having an electronic token ET according to the invention.

The distant machine SE may be a server able to exchange data by means of a wireless channel WI. The wireless channel WI may be the Over The Air mechanism—known as OTA—defined by the GSM 03.40, GSM 03.48 and/or ETSI/SCP-3GPP-3GPP2 standards. The wireless device BOX comprises a communication interface INT2, an electronic token ET connected to the interface INT2 and means MS5. The electronic token ET may be a SIM card. The means MS5 are able to establish a wireless channel WI with the distant machine SE.

The wireless device BOX may comprise an electronic token ET of SIM smart card type. The wireless device BOX may be integrated in systems such as an automatic drink distributor or a car for example.

Figure 2:
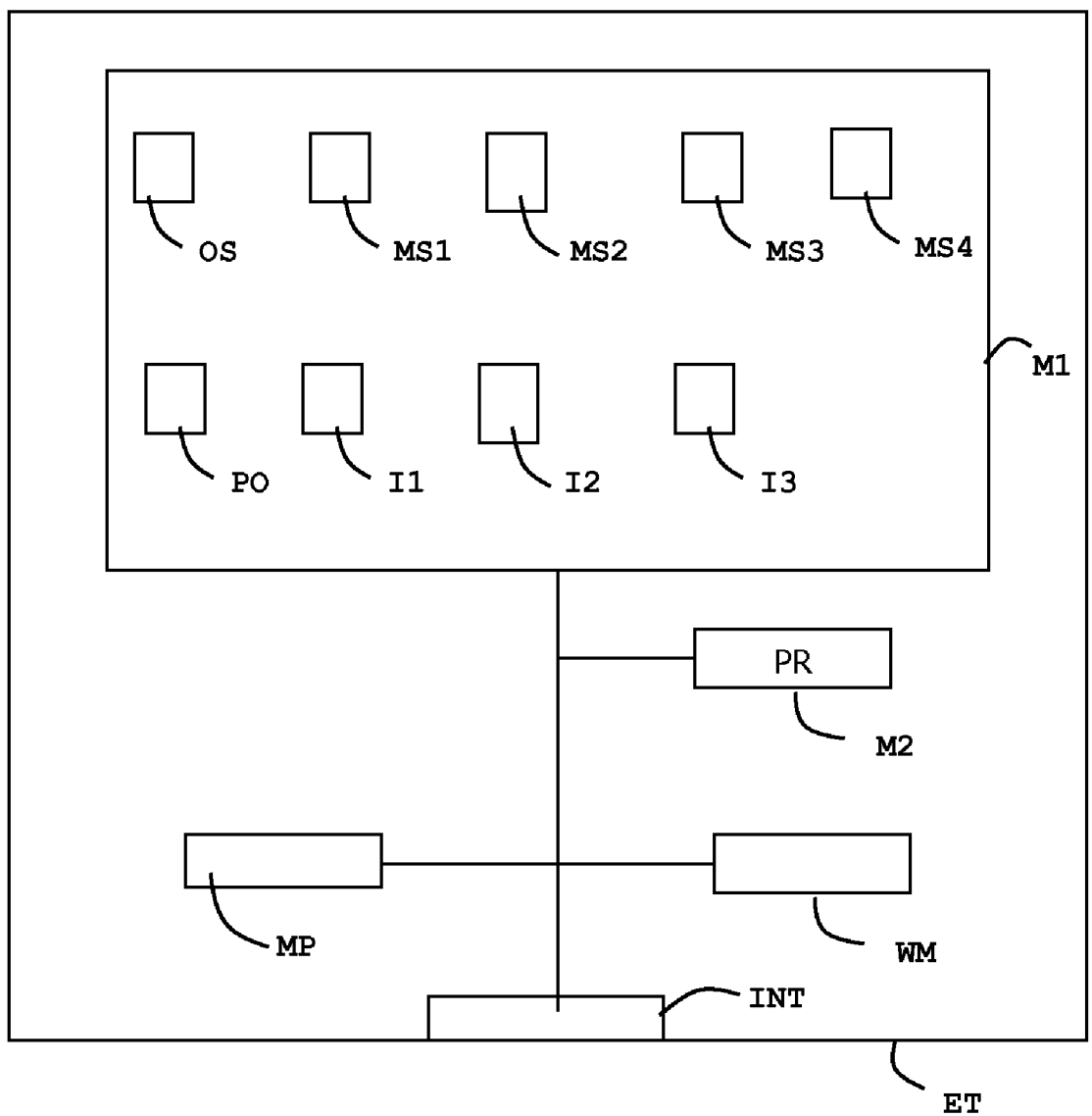
FIG. 2 depicts schematically the architecture of a subscriber identity card of SIM smart card type according to the invention.

FIG. 2 shows an example of architecture of a SIM card as an example of a subscriber identity card according to a preferred embodiment of the invention. The SIM card ET contains a microprocessor MP, a communication interface INT, first and second memories M1 and M2, and a working memory WM like a RAM. The communication interface INT is intended to be connected to a wireless device and allows exchanging data with the connected device. The two memories M1 and M2 are non volatile memories like EEPROM or Flash memory. The memory M1 contains an operating system OS, a memory lifespan management policy PO, three items I1 to I3 and three means MS1, MS2 and MS3. Each of items I1, I2 and I3 may be a physical object or a logical object or an applicative object. The first means MS1 is able to exchange data with a distant machine SE by means of a wireless channel WI established by the connected device BOX. For example, first means MS1 may implement the Over The Air mechanism. The second means MS2 may manage the content of one or of several memories belonging to the electronic token. The third means MS3 is able to update the memory lifespan management policy PO. The memory M2 contains properties PR of the electronic token ET, such as the size of memories belonging to the electronic token ET or the type of electronic token.

The two memories M1 and M2 may consist in a unique circuit or several circuits that may be of different types. The two memories M1 and M2 may be merged in a unique memory.

The operating system OS may comprise a virtual machine.

The microprocessor MP cooperates with the working memory WM and is intended to run the operating system OS. First, second and third means MS1 to MS3 may be either software applications run by the microprocessor MP or hardware designed. The three means may be implemented as three distinct elements or merged in one or several elements.

In a preferred embodiment, the three means are implemented as three different software applications.

Figure 3:
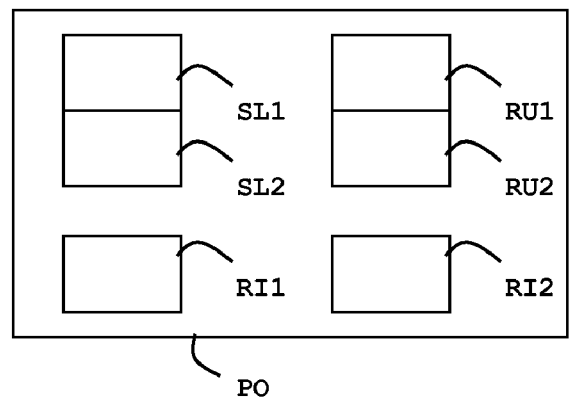
FIG. 3 is an example of memory lifespan management policy.

FIG. 3 shows an example of definition of memory lifespan management policy PO. The memory lifespan management policy PO is defined by associating at least one rule to at least one item of the electronic token ET. This association may be managed by using reference data RI1, RI2 dedicated to items I1, I2. A plurality of rules RU1, RU2 may be used. Each rule identifies a specific way of managing the memory. For example rule RU1 may be related to wear leveling and rule RU2 may be related to anti-aging of memory cells. Rule RU1 may correspond to the shift of two memory areas content and RU2 may correspond to the rewriting of memory area content.

In a preferred embodiment, a plurality of stress levels SL1, SL2 are defined. Each of said stress levels has at least one rule associated to it. For example stress level SL1 may be associated to rule RU1 and stress level SL2 may be associated to both rules RU1 and RU2.

Figure 4:
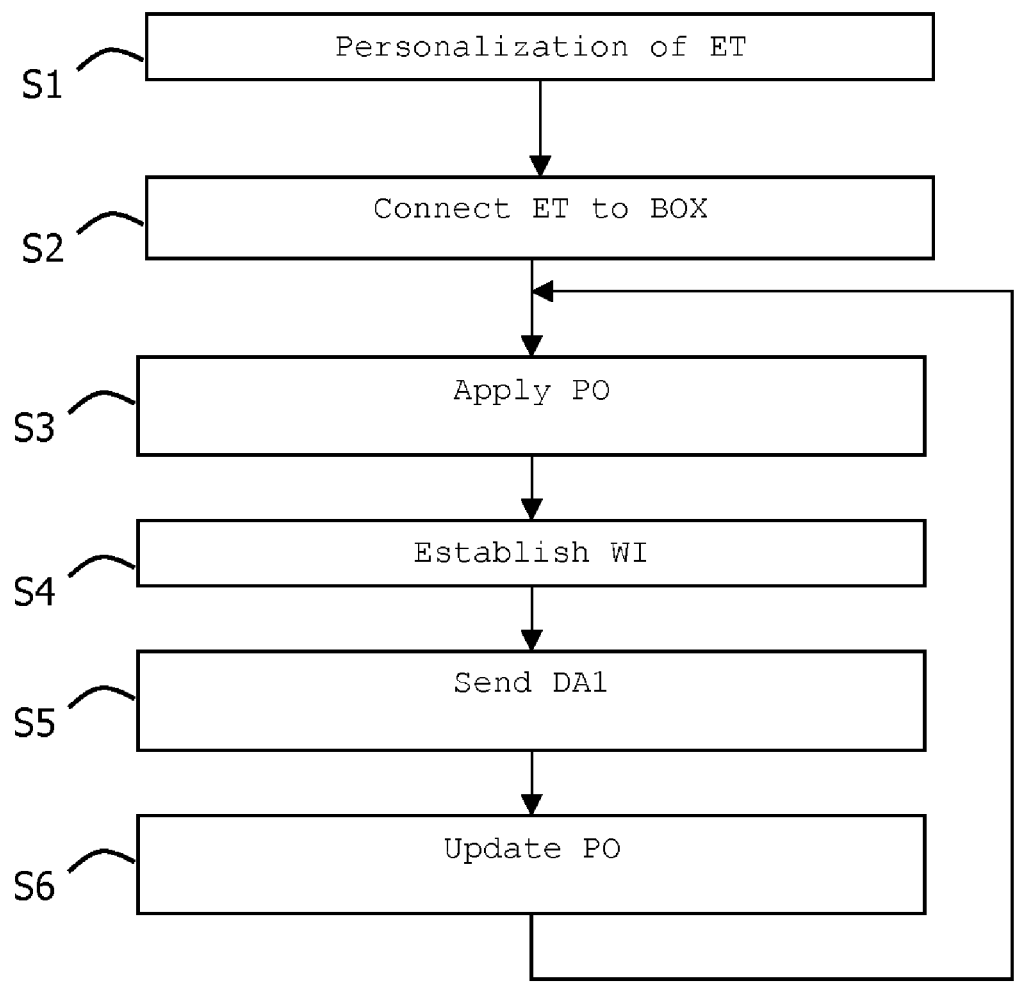
FIG. 4 is an example of algorithm for customizing the memory lifespan management policy according to the invention.

FIG. 4 shows an example of algorithm for customizing a memory lifespan management policy PO. First the electronic token ET is personalized at step S1. This step corresponds to the writing of predefined data common to a set of electronic tokens. Data specific to each electronic token may be also written at step S1. The memory lifespan management policy PO may be partly initialized at this step.

Then the electronic token ET is connected to a wireless device BOX at step S2. This connection may be done by a welding operation or using a removable plug system.

At step S3, second means MS2 applies the current memory lifespan management policy PO to the electronic token memory.

A wireless channel WI is then established between the wireless device BOX and the distant machine SE at step S4. This communication channel may be an Over The Air channel. This wireless channel WI allows the distant machine SE to exchange data with the electronic token ET via the wireless device BOX.

At step S5, the distant machine SE send data DA1 to the wireless device BOX. Then the wireless device BOX sends data DA1 to the electronic token ET via the communication interface INT2. Data DA1 may comprise indicators IN1 and IN2 of the stress level related to items I1, I2 managed in the electronic token. For example indicator IN1 may correspond to the stress level SL1 and indicator IN2 may correspond to the stress level SL2. The indicator IN1 may be associated to item I1 and indicator IN2 may be associated to item I2.

At step S6, the third means MS3 updates the current memory lifespan management policy PO according to the received data DA1. As a consequence, third means MS3 updates the current memory lifespan management policy PO by associating the stress level SL1 to the item I1 and by associating the stress level SL2 to the item I2. Then next time, the second means MS2 will apply the memory lifespan management policy PO, rule RU1 will be applied to item I1 and both rules RU1 and RU2 will be applied to item I2.

Advantageously, an item may be specific data managed by an application. Alternatively, an item may be a memory zone defined by a logical or physical address.

For example, for the wireless device BOX intended to be integrated in a car, the file $EF_{loci}$ stored in the SIM card will be particularly stressed. Thus the memory lifespan management policy PO of the SIM may be customized by associating a specific rule to the target file $EF_{loci}$. For instance, the specific rule may correspond to a change of the physical address of a targeted file to another physical address each time the targeted file is updated.

In the case of a wireless device BOX intended to be integrated in a automatic drink distributor, the file $EF_{sms}$ stored in the SIM card may be particularly stressed if the distributor sends and/or receives many messages of SMS type. For example, messages of SMS type may be used for the stock reporting. Thus the memory lifespan management policy PO of the SIM may be customized by associating a specific rule to the $EF_{sms}$.

For example, the specific rule may correspond to write the targeted file at a different address each time an update operation is performed on said file.

Alternatively, at step S5, the wireless device BOX may send a dedicated signal to the distant machine SE before the distant machine SE send data DA1 to the wireless device BOX.

Alternatively, steps S4 and S5 may be replaced with a unique step corresponding to the generation of a dedicated event in the wireless device BOX. This event identifies data required for updating the current memory lifespan management policy PO. In this example, the memory lifespan management policy PO is updated without any message being sent by the distant machine SE and the wireless device BOX comprises means MS4 able to generate said dedicated event and data required for updating the memory lifespan management policy PO.

The invention claimed is:

1. An electronic token intended to be connected to a device able to establish a wireless channel, said electronic token comprising:
   a microprocessor,
   a communication interface,
   a first memory intended to comprise a memory lifespan management policy,
   an operating system,
   first means for exchanging data with a distant machine by means of a wireless channel established by said connected device,
   second means for applying said memory lifespan management policy in said electronic token, and
   a third means adapted for updating said memory lifespan management policy as a function of data received from said distant machine wherein said memory lifespan management policy is defined by at least one stress level, wherein at least one rule is associated to each of said stress levels and wherein said received data comprises an indicator of the stress level associated to each of said items identified by said received data.

2. An electronic token according to claim 1, wherein said electronic token comprises a second memory storing properties of said electronic token and wherein said third means is able to update the memory lifespan management policy as a function of both received data and stored properties.

3. An electronic token according to claim 1, wherein said electronic token is intended to store a plurality of items and wherein said received data identify at least one of said items.

4. An electronic token according to claim 3, wherein said memory lifespan management policy is defined by associating at least one rule to at least one of said items.

5. An electronic token according to claim 4, wherein said rules are related to wear leveling mechanism and/or the memory cell anti-aging mechanism.

6. An electronic token according to claim 3, wherein said items are logical and/or physical and/or applicative data.

7. An electronic token according to claim 3, wherein said electronic token is a subscriber identity card, wherein said wireless channel is an Over The Air channel and wherein at least one item is a file of $EF_{sms}$ or $EF]_{oc}i$ type.

8. An electronic token according to claim 1, wherein said electronic token comprises fourth means adapted for generating an event and related data required for updating the memory lifespan management policy.

9. A method of customizing a memory lifespan management policy of an electronic token, said electronic token being intended to be connected to a device able to establish a wireless channel, said electronic token having a microprocessor, a communication interface, a first memory intended to comprise said memory lifespan management policy, an operating system, first means for exchanging data with a distant machine by means of a wireless channel established by said connected device, second means for applying said memory lifespan management policy in said electronic token, third means for updating said memory lifespan management policy, wherein said memory lifespan management policy is defined by at least one stress level, wherein at least one rule is associated to each of said stress levels, wherein said received data comprises an indicator of the stress level associated to each of items identified by said received data and wherein said method comprises the following steps:
 a) sending data from the distant machine to the electronic token by means of a wireless channel, and
 b) updating said memory lifespan management policy as a function of data received from said distant machine.

10. A method according to claim 9, wherein said electronic token comprises a second memory storing properties of said electronic token, and wherein during the updating step b) the memory lifespan management policy is updated as a function of both received data and stored properties.

11. A method according to claim 9, wherein said electronic token stores a plurality of items and wherein said received data identify at least one of said items.

12. A method according to claim 11, wherein said memory lifespan management policy is defined by associating at least one rule to at least one of said items.

13. A method according to claim 11, wherein said rules are related to wear leveling mechanism and/or the memory cell anti-aging mechanism.

14. A method according to claim 11, wherein said items are logical and/or physical and/or applicative data.

15. A method according to claim 11, wherein said electronic token is a subscriber identity card, wherein the wireless channel is an Over The Air channel.

16. A method according to claim 15, wherein at least one item is a file of $EF_{sms}$ or $EF]_{oc}i$ type.

17. A device, comprising:
 means able to establish a wireless channel with a distant machine,
 an electronic token,
 a communication interface,
wherein said electronic token is of claim 1 type and wherein said electronic token is connected to said device by means of a welding or in a removable way.

* * * * *